United States Patent
Salter et al.

(10) Patent No.: US 11,083,650 B2
(45) Date of Patent: Aug. 10, 2021

(54) VEHICLE WHEELCHAIR LOADING

(71) Applicant: Ford Global Technologies, LLC, Dearborn, MI (US)

(72) Inventors: Stuart C. Salter, White Lake, MI (US); Cornel Lewis Gardner, Romulus, MI (US); Paul Kenneth Dellock, Northville, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 531 days.

(21) Appl. No.: 15/842,412

(22) Filed: Dec. 14, 2017

(65) Prior Publication Data

US 2019/0183697 A1    Jun. 20, 2019

(51) Int. Cl.
| | |
|---|---|
| *B60Q 1/26* | (2006.01) |
| *A61G 3/06* | (2006.01) |
| *A61G 3/08* | (2006.01) |
| *A61G 3/02* | (2006.01) |
| *G01S 17/88* | (2006.01) |
| *B60Q 1/24* | (2006.01) |
| *G01S 7/51* | (2006.01) |

(52) U.S. Cl.
CPC .............. *A61G 3/062* (2013.01); *A61G 3/02* (2013.01); *A61G 3/0209* (2013.01); *A61G 3/061* (2013.01); *A61G 3/0808* (2013.01); *B60Q 1/24* (2013.01); *G01S 7/51* (2013.01); *G01S 17/88* (2013.01); *A61G 3/067* (2016.11)

(58) Field of Classification Search
CPC ...... A61G 3/062; A61G 3/0808; A61G 3/061; A61G 3/0209; A61G 3/067; G01S 17/88
USPC .......................................................... 340/468
See application file for complete search history.

(56) References Cited

U.S. PATENT DOCUMENTS

| | | | |
|---|---|---|---|
| 2014/0218212 A1* | 8/2014 | Nykerk | B60Q 1/0023 340/901 |
| 2015/0023036 A1 | 1/2015 | Burgess | |
| 2017/0001554 A1 | 1/2017 | Sorensen et al. | |
| 2017/0178498 A1* | 6/2017 | Mcerlean | B60K 35/00 |

FOREIGN PATENT DOCUMENTS

| | | |
|---|---|---|
| JP | 2009102903 A | 5/2009 |
| JP | 2009173381 A | 8/2009 |
| JP | 2009196537 A | 9/2009 |
| JP | 2011098617 A | 5/2011 |

* cited by examiner

*Primary Examiner* — Tanmay K Shah
(74) *Attorney, Agent, or Firm* — Frank A. MacKenzie; Bejin Bieneman PLC (57) ABSTRACT

A system for a vehicle includes a LIDAR sensor attachable to the vehicle and a puddle lamp fixed relative to the LIDAR sensor and oriented to project a light projection downward beside the vehicle. A computer may be in communication with the LIDAR sensor and the puddle lamp and programmed to actuate the puddle lamp in response to receiving data generated by the LIDAR sensor indicating a user positioned within a threshold distance of the vehicle.

16 Claims, 8 Drawing Sheets

US 11,083,650 B2

VEHICLE WHEELCHAIR LOADING

BACKGROUND

Accommodations for wheelchairs in vehicles are typically installed with modifications to a vehicle. The modifications may be a loading apparatus to carry and/or permit a wheelchair to enter the vehicle. Types of loading apparatuses include a deployable ramp, an elevatable platform, etc. The loading apparatus is typically installed behind a side door, such as a sliding door, or behind a rear lifting door of a van.

DETAILED DESCRIPTION

A system for a vehicle includes a LIDAR sensor attachable to the vehicle, and a puddle lamp fixed relative to the LIDAR sensor and oriented to project a light projection downward beside the vehicle.

The LIDAR sensor may be attachable to an A pillar of the vehicle.

The puddle lamp may be attached to the LIDAR sensor. The puddle lamp may be disposed underneath the LIDAR sensor.

The system may include a computer in communication with the LIDAR sensor and the puddle lamp, and the computer may be programmed to actuate the puddle lamp in response to receiving data from the LIDAR sensor indicating a user positioned within a threshold distance of the vehicle. The light projection may be a first light projection, and the computer may be programmed to actuate the puddle lamp to project the first light projection in response to receiving data from the LIDAR sensor indicating the user positioned within the threshold distance from the vehicle, and then actuate the puddle lamp to project a second light projection in response to receiving data from the LIDAR sensor indicating that the user is positioned at a designated location relative to the vehicle. The first light projection and the second light projection may have at least one of different shapes and different colors.

The computer may be programmed to actuate a door of the vehicle to open in response to receiving data from the LIDAR sensor indicating that the user is positioned at a designated location relative to the vehicle.

The light projection may be a first light projection, and the computer may be programmed to actuate the puddle lamp to project the first light projection in response to receiving data from the LIDAR sensor indicating the user positioned within the threshold distance from the vehicle, and then actuate the puddle lamp to project a second light projection in response to receiving data from the LIDAR sensor indicating an obstruction in a designated area relative to the vehicle.

A system for a vehicle includes a sensor, a puddle lamp fixed relative to the sensor and oriented to project a light projection downward beside the vehicle, and a computer in communication with the sensor and the puddle lamp and programmed to actuate the puddle lamp in response to receiving data generated by the sensor indicating a user positioned within a threshold distance of the vehicle.

The light projection may be a first light projection, and the computer may be programmed to actuate the puddle lamp to project the first light projection in response to receiving data generated by the sensor indicating the user positioned within the threshold distance of the vehicle, and then actuate the puddle lamp to project a second light projection in response to receiving data generated by the sensor indicating that the user is positioned at a designated location relative to the vehicle. The first light projection and the second light projection may have at least one of different shapes and different colors.

The computer may be programmed to actuate a door of the vehicle to open in response to receiving data generated by the sensor indicating that the user is positioned at a designated location relative to the vehicle.

The light projection may be a first light projection, and the computer may be programmed to actuate the puddle lamp to project the first light projection in response to receiving data generated by the sensor indicating the user positioned within the threshold distance from the vehicle, and then actuate the puddle lamp to project a second light projection in response to receiving data generated by the sensor indicating an obstruction in a designated area relative to the vehicle.

The system may include a plurality of Bluetooth Low Energy sensors including the sensor. The computer may be programmed to triangulate a position of the user based on data generated by the Bluetooth Low Energy sensors.

The system may include the vehicle including a body, a plurality of doors, the sensor, the puddle lamp, and the computer, and the puddle lamp may be attached to the body and spaced from the doors. The puddle lamp may be oriented to project the light projection beside one of the doors.

Figure 1:
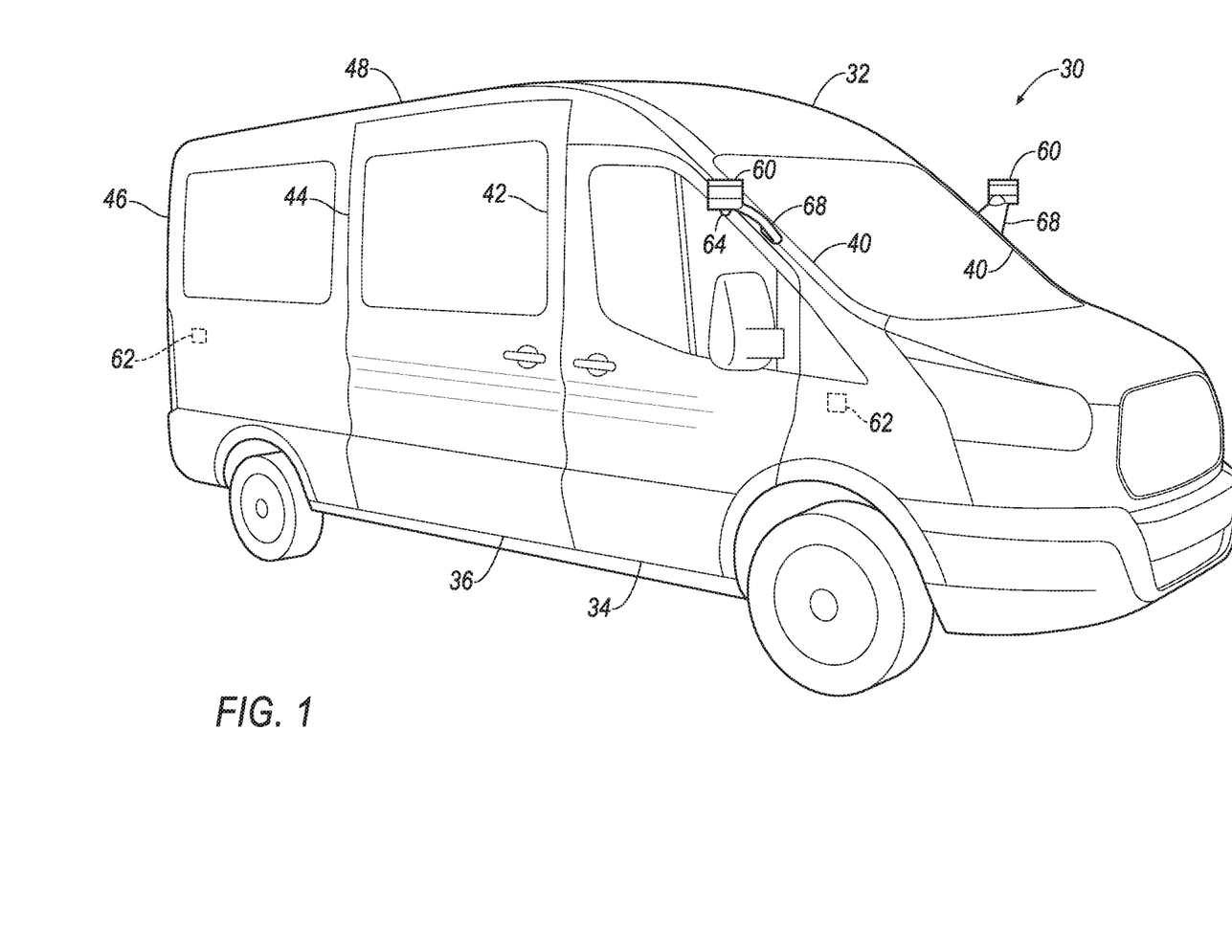
FIG. 1 is a perspective view of an example vehicle with doors closed and a loading apparatus retracted.

As illustrated in FIG. 1, a system 31 for a vehicle 30 includes a sensor 60 attachable to the vehicle 30 and a puddle lamp 64 fixed relative to the sensor 60 and oriented to project a light projection 70, 74, 76, 80 downward beside the vehicle 30. A computer 54 may be in communication with the sensor 60 and the puddle lamp 64 and programmed to actuate the puddle lamp 64 in response to receiving data generated by the sensor 60 indicating a user positioned within a threshold distance of the vehicle 30.

The system 31 provides an automated, easy-to-understand way for a user in a wheelchair 52 to enter the vehicle 30. The sensor 60 and the puddle lamp 64 combine to actuate the puddle lamp 64 based on a location of the user and the steps performed to load the wheelchair 52 into the vehicle 30. The system 31 tracks the user and operates a loading apparatus 50, and illuminates the puddle lamp 64 based on the location of the user. The puddle lamp 64 can be actuated to illuminate to provide light projections 70, 74, 76, 80 as seen in FIGS. 3-6 to communicate to the user concerning steps of a wheelchair-loading operation. Based on the illumination of the puddle lamp 64, he user may be able to enter the vehicle 30 with less assistance and greater independence.

With reference to FIG. 1, the vehicle 30 includes a body 32. The vehicle 30 may be of a unibody construction, in which a frame and the body 32 of the vehicle 30 are a single component, as shown in the Figures. The vehicle 30 may, alternatively, be of a body-on-frame construction, in which the frame supports the body 32 that is a separate component from the frame. The frame and body 32 may be formed of any suitable material, for example, steel, aluminum, etc.

The body 32 supports a plurality of doors 34, 36, 38. The doors 34, 36, 38 may be arranged on the sides and/or the rear of the vehicle 30 and may include front doors 34 and rear doors 36, 38. The doors 34, 36, 38, e.g., the rear doors 36, 38, may include at least one accessible door 36, behind which is the loading apparatus 50 for a wheelchair 52 (described below), and a nonaccessible door 38. The doors 34, 36, 38 may be conventional doors hinged at a front edge of the door that swing horizontally away from the body 32. Some of the doors 34, 36, 38 may be sliding doors that are mounted on and slide horizontally along a track next to the body 32 of the vehicle 30. The accessible door 36 is drivably movable relative to the body 32, such as by including an electric motor (not shown). More or fewer doors 34-38 than shown could be included in the vehicle 30.

The body 32 of the vehicle 30 may include A pillars 40, B pillars 42, C pillars 44, D pillars 46, and roof rails 48. The A pillars 40 may extend between a windshield and the front doors 34. The B pillars 42 may extend between the front doors 34 and the rear doors 36, 38. The C pillars 44 may extend between the rear doors 36, 38 and a rear end of the vehicle 30. If the vehicle 30 is, e.g., a van (as shown), SUV, crossover, or station wagon, the D pillars 46 extend vertically at the rear corners of the vehicle 30. The roof rails 48 extend along top of the doors 34, 36, 38 from the A pillar 40 to the B pillar 42 to the C pillar 44 to the D pillar 46.

Figure 2:
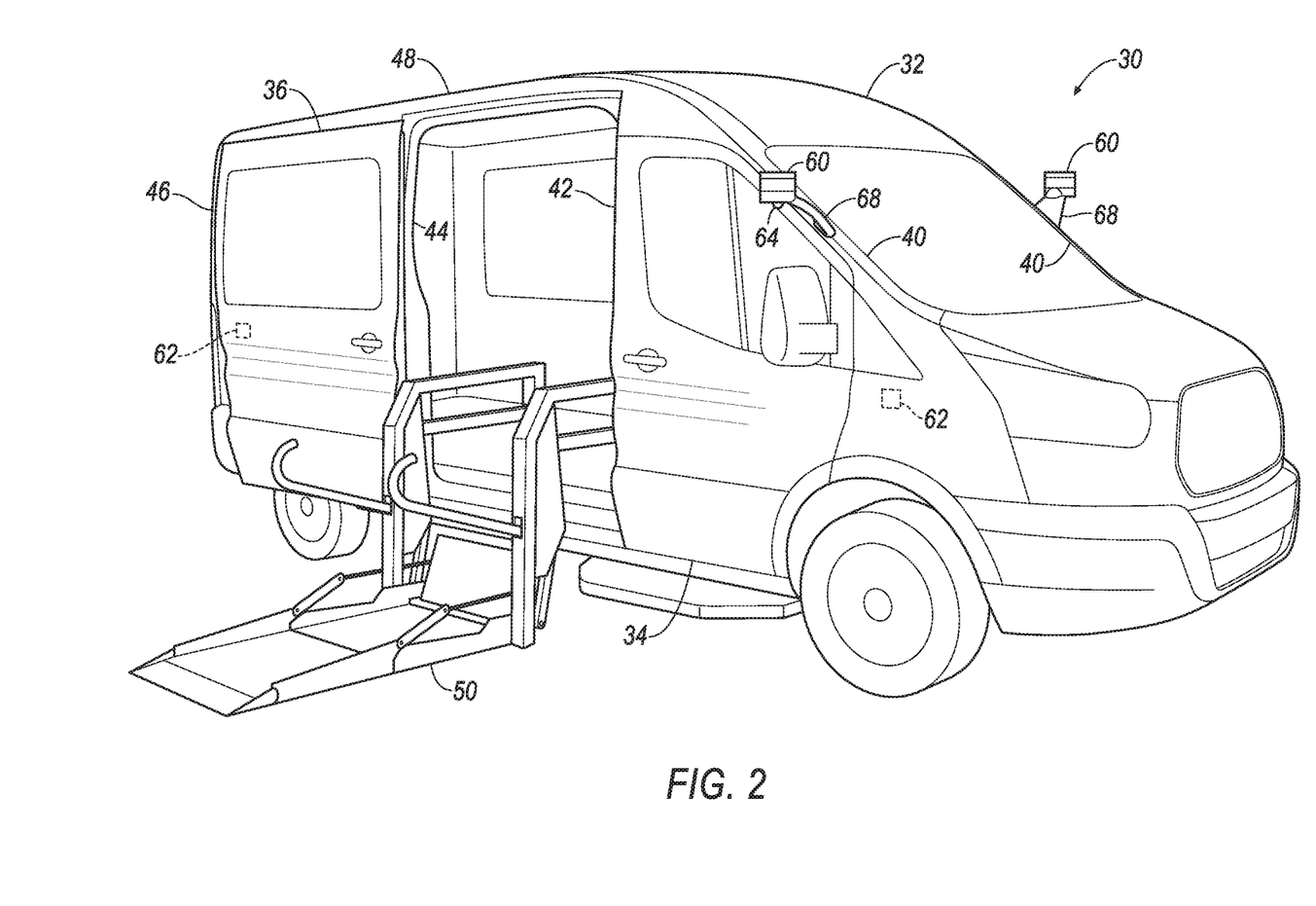
FIG. 2 is a perspective view of the vehicle of FIG. 1 with one of the doors open and the loading apparatus extended.

With reference to FIG. 2, the loading apparatus 50 may be fixed relative to the body 32 and disposed inside and adjacent to the accessible door 36. The loading apparatus 50 may be closer to the accessible door 36 than to any of the other doors 34, 38. The loading apparatus 50 may be any mechanism to carry and/or permit a wheelchair 52 to enter the vehicle 30. For example, the loading apparatus 50 may be a deployable ramp, an elevatable platform, etc., as are known.

Figure 7:
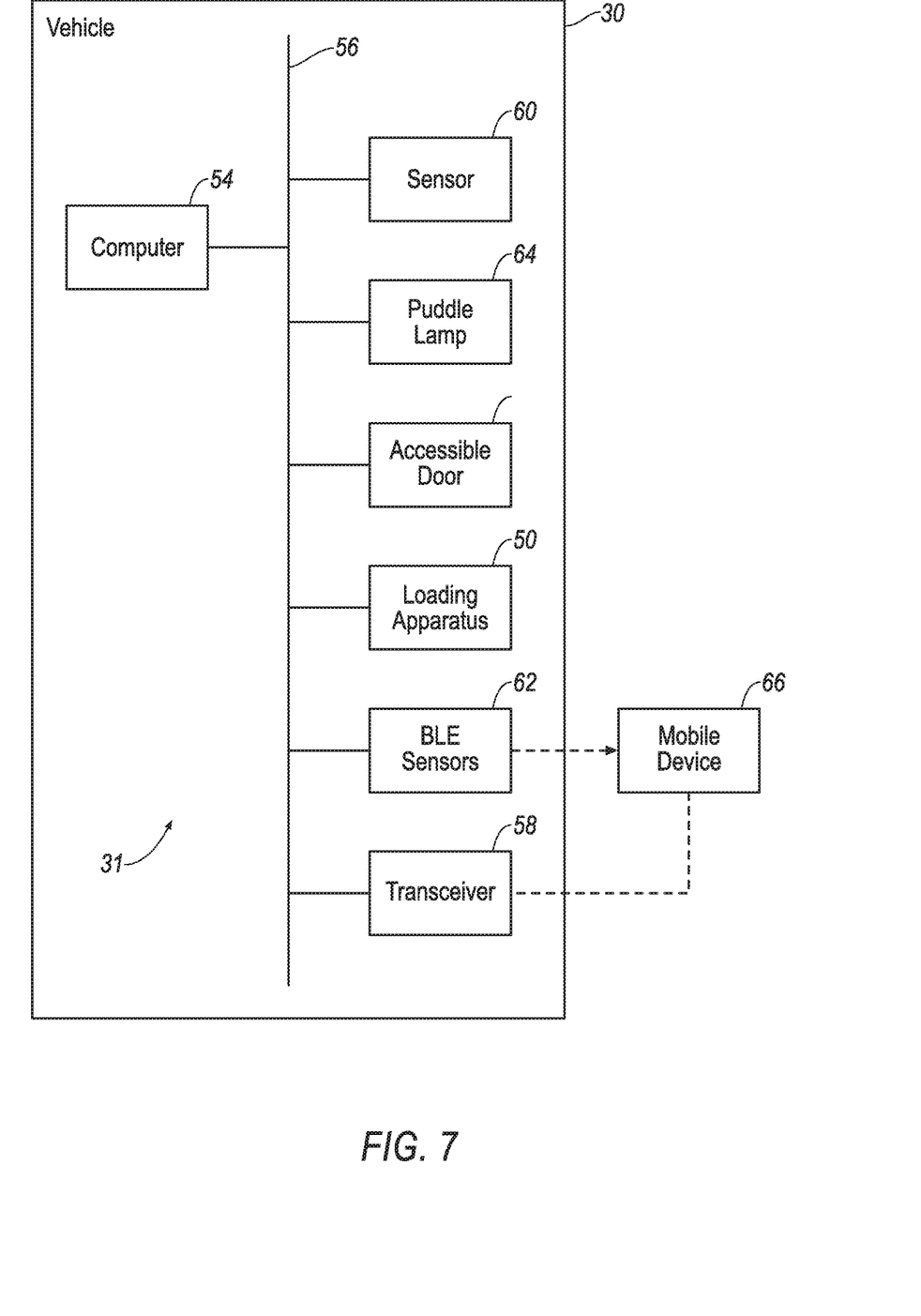
FIG. 7 is a block diagram of a control system for the vehicle of FIG. 1.

With reference to FIG. 7, the vehicle 30 includes the computer 54. The computer 54 is a microprocessor-based computer. The computer 54 includes a processor, memory, etc. The memory of the computer 54 includes memory for storing instructions executable by the processor as well as for electronically storing data and/or databases.

The computer 54 may transmit and receive data through a communications network 56 such as a controller area network (CAN) bus, Ethernet, WiFi, Local Interconnect Network (LIN), onboard diagnostics connector (OBD-II), and/or by any other wired or wireless communications network. The computer 54 may be in communication with the accessible door 36, the loading apparatus 50, a transceiver 58, the sensor 60, a plurality of Bluetooth Low Energy (BLE) sensors 62, a puddle lamp 64, and other components via the communications network 56.

The transceiver 58 is connected to the communications network 56. The transceiver 58 may be adapted to transmit signals wirelessly through any suitable wireless communication protocol, such as Bluetooth®, WiFi, IEEE 802.11a/b/g, other RF (radio frequency) communications, etc. The transceiver 58 may be adapted to communicate with a remote server, that is, a server distinct and spaced from the vehicle 30. The remote server may be located outside the vehicle 30. For example, the remote server may be associated with other vehicles (e.g., V2V communications), infrastructure components (e.g., V2I communications via Dedicated Short-Range Communications (DSRC) or the like), emergency responders, a mobile device 66 associated with an owner or user of the vehicle 30, etc. The transceiver 58 may be one device or may include a separate transmitter and receiver.

With reference to FIG. 1, a sensor arm 68 is elongated from the body 32 and supports the sensor 60. For example, the sensor arm 68 may extend from the A pillar 40. The sensor 60 is attachable to the vehicle 30, e.g., the A pillar 40, via the sensor arm 68. Alternatively, the sensor arm 68 may be attached to the roof rail above the doors 34, 36, 38, to the D pillar 46, or to any other position on the body 32 that does not move when the doors 34, 36, 38 open and close. The sensor arm 68 may have a tubular or other hollow shape, that is, a cavity may extend through the sensor arm 68. The cavity may allow wiring, tubes, etc. to pass through the sensor arm 68 while being shielded from the outside environment.

The sensor 60 may be designed to detect features of the outside world; for example, the sensor 60 may be a radar sensor, a scanning laser range finder, a light detection and ranging (LIDAR) device, or an image processing sensor such as a camera. In one example, the sensor 60 is a LIDAR device. A LIDAR device detects distances to objects by emitting laser pulses at a particular wavelength and measuring a time of flight for the pulse to travel to the object and back.

The vehicle 30 includes a plurality of the BLE sensors 62. Each BLE sensor 62 emits a signal that can be detected by the mobile device 66. The signal may include a location of the BLE sensor 62 relative to the body 32 of the vehicle 30. The mobile device 66 can approximate a distance to the BLE sensor 62 by measuring the signal strength of the signal from the BLE sensor 62. Using the locations of and the approximate distances to the BLE sensors 62, the mobile device 66 can determine its location relative to the vehicle 30 using known triangulation techniques, and the mobile device 66 can send that location to the computer 54 via the transceiver 58. The triangulation may be in two horizontal dimensions. Alternatively, the mobile device 66 can transmit the signal strengths or approximate distances to the BLE sensors 62 to the computer 54 via the transceiver 58, and the computer 54 can then triangulate the location of the mobile device 66 relative to the vehicle 30.

The BLE sensors 62 are fixed relative to the body 32 and spaced from each other horizontally relative to the body 32. The BLE sensors 62 are spaced sufficiently to provide different signal strengths from different BLE sensors 62 to the mobile device 66, which permits a more accurate triangulation.

The puddle lamp 64 is fixed relative to the body 32, and the puddle lamp 64 is fixed relative to the sensor 60. The puddle lamp 64 is attached directly or indirectly to the body 32. For example, the puddle lamp 64 may be attached to the sensor 60, and the puddle lamp 64 may be disposed underneath the sensor 60, i.e., on a surface of the sensor 60 facing downward relative to the body 32. The puddle lamp 64 is spaced from the doors 34, 36, 38 and remains in a fixed location relative to the body 32 when the doors 34, 36, 38 move.

A "puddle lamp," for the purposes of this disclosure, is a lamp oriented to illuminate the ground beside the vehicle 30. The puddle lamp 64 may be any lighting system suitable for illuminating a roadway beside the vehicle 30, including tungsten, halogen, high-intensity discharge (HID) such as xenon, light-emitting diode (LED), laser, etc. The puddle lamp 64 can switch between projecting light projections 70, 74, 76, 80 of different shapes and/or different colors of light on the ground. For example, the puddle lamp 64 may include a plurality of bulbs, and illuminating different arrangements of the bulbs results in light projections 70, 74, 76, 80 of different shapes projected by the puddle lamp 64 on the ground. For another example, the puddle lamp 64 may include a plurality of stencils, and shining light through respective stencils projects light projections 70, 74, 76, 80 of different shapes on the ground. For another example, the puddle lamp 64 may include a single stencil and multiple bulbs of different colors behind the stencil, and illuminating different bulbs projects light projections 70, 74, 76, 80 of the same shape in different colors on the ground.

The puddle lamp 64 is oriented to project a light projection 70, 74, 76, 80 downward beside the vehicle 30. For example, the puddle lamp 64 may be positioned and oriented to project a light projection 70, 74, 76, 80 beside the accessible door 36. The puddle lamp 64 may be positioned to project a light projection 70, 74, 76, 80 on the ground regardless of whether the accessible door 36 is open or closed.

Figure 8:
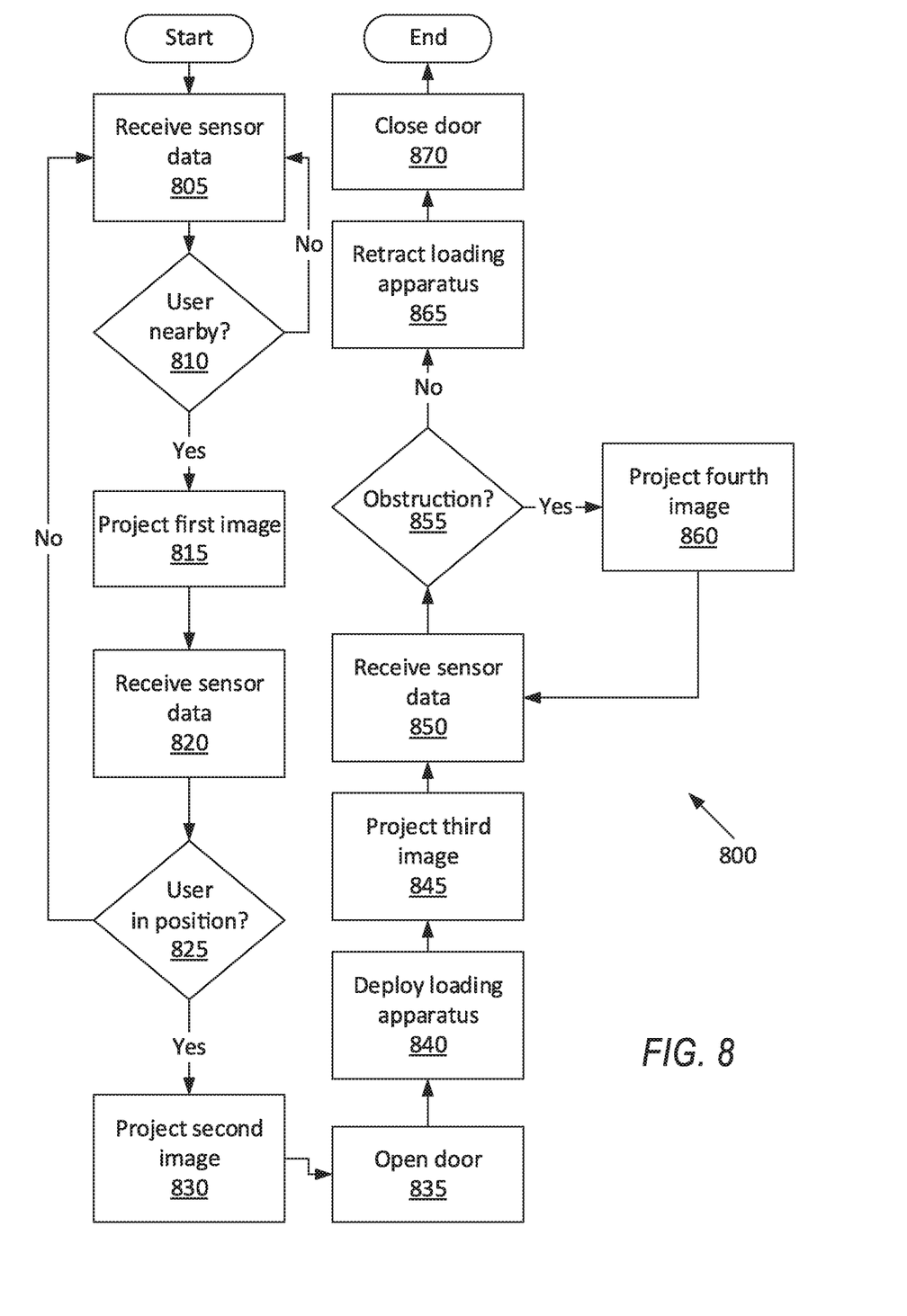
FIG. 8 is a process flow diagram of an example process for loading a user into the vehicle of FIG. 1.

FIG. 8 is a process flow diagram illustrating an exemplary process 800 for loading a user into the vehicle 30. The memory of the computer 54 typically stores executable instructions for performing the steps of the process 800.

The process 800 begins in a block 805, in which the computer 54 receives data generated by the sensor 60 and/or the BLE sensors 62. The data permits the computer 54 to determine a two-dimensional horizontal position (i.e., location) of a user. For example, the computer 54 may receive data from the sensor 60 and perform a conventional object-recognition algorithm on the data to recognize an object, e.g., a user in a wheelchair 52, as well as a distance from the sensor 60 to the object, e.g., wheelchair 52. Data representing users in wheelchairs in various orientations may be stored in the memory of the computer 54 as baseline data for the computer 54 to compare to the data received from the sensor 60. For another example, the computer 54 may receive the position of the mobile device 66 of the user from the mobile device 66 via the transceiver 58, which the mobile device 66 determined using the signals from the BLE sensors 62, as described above. For another example, the computer 54 may receive the signal strengths or approximate distances to each of the BLE sensors 62 from the mobile device 66 via the transceiver 58, as described above.

Next, in a decision block 810, the computer 54 determines whether the data generated by the sensor 60 or the BLE sensors 62 indicates that the user is positioned within a threshold distance from the vehicle 30. The position determined in the block 805 is compared to the position of the vehicle 30. The threshold distance may be chosen so that the user is close enough to position him- or herself to immediately enter the vehicle 30 upon deployment of the loading apparatus 50. If a user is not within the threshold distance, the process 800 returns to the block 805 to continue receiving data until a user is within the threshold distance.

Figure 3:
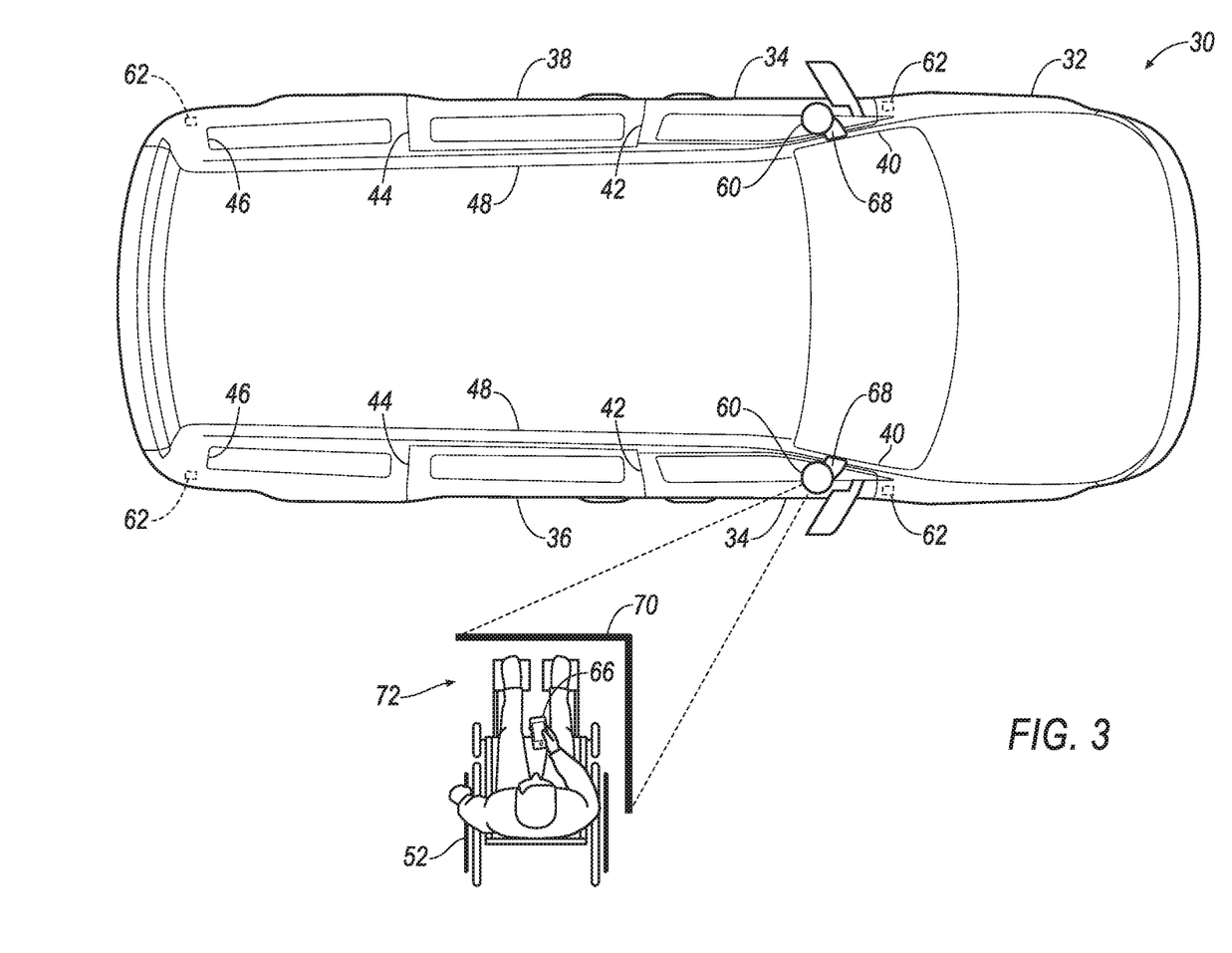
FIG. 3 is a top view of the vehicle of FIG. 1 with a puddle lamp projecting a first light projection.

If a user is within the threshold distance, next, in a block 815, the computer 54 actuates the puddle lamp 64 to project a first light projection 70 on the ground in front of the accessible door 36. (The adjectives "first," "second," "third," and "fourth" are used throughout this document as identifiers and are not intended to signify importance or order.) The first light projection 70 may be chosen to communicate to the user to move to a designated location 72. For example, as shown in FIG. 3, the first light projection 70 may be two lines forming a right angle; if the user positions the wheelchair 52 inside the angle, then the wheelchair 52 is in the designated location 72. The first light projection 70 may be a first color, e.g., red, to indicate that the user should not pass the first light projection 70 closer to the vehicle 30.

Next, in a block 820, the computer 54 receives data generated by the sensor 60 and/or by the BLE sensors 62, as described above with respect to the block 805.

Next, in a decision block 825, the computer 54 determines from the received data whether the user is positioned at the designated location 72 relative to the vehicle 30. The position of the user determined in the block 820 is compared with the position of the vehicle 30 to determine the relative location of the user. If the user is not positioned at the designated location 72, the process 800 returns to the block 805 to continue receiving data until a user is within the threshold distance and then at the designated location 72.

Figure 4:
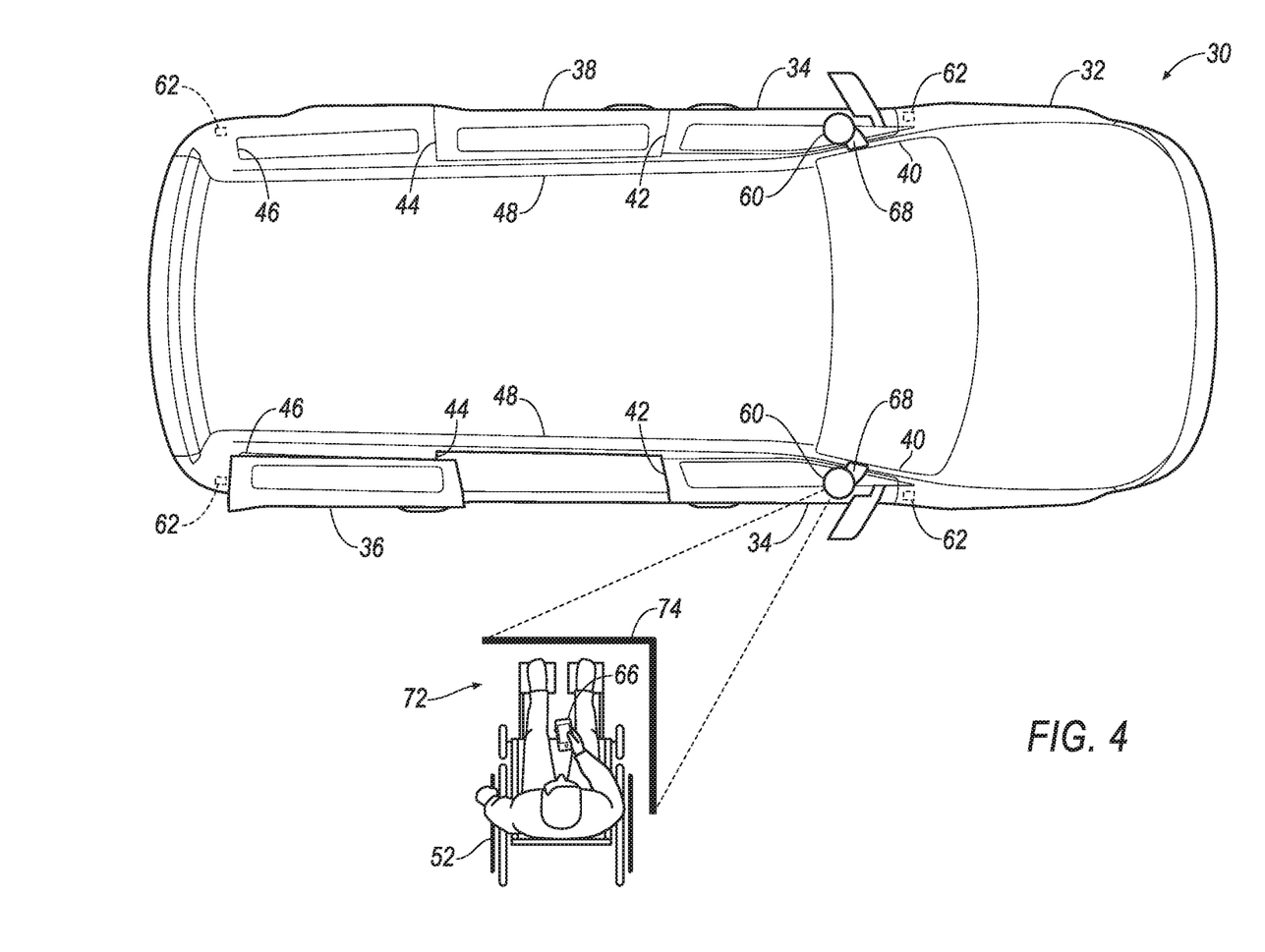
FIG. 4 is a top view of the vehicle of FIG. 1 with the puddle lamp projecting a second light projection.

If a user is positioned at the designated location 72, next, in a block 830, the computer 54 actuates the puddle lamp 64 to project a second light projection 74 on the ground in front of the accessible door 36. The second light projection 74 has at least one of a different shape and a different color than the first light projection 70. The second light projection 74 may be chosen to communicate to the user to wait while the accessible door 36 opens and the loading apparatus 50 deploys. For example, as shown in FIG. 4, the second light projection 74 may be two lines forming a right angle around the designated location 72, instructing the user to remain at the designated location 72. The second light projection 74 may be a second color, e.g., yellow, to indicate that the user should wait.

Next, in a block 835, the computer 54 actuates the accessible door 36 of the vehicle 30 to open.

Next, in a block 840, the computer 54 actuates the loading apparatus 50 to deploy. For example, the loading apparatus 50 may extend a ramp of the loading apparatus 50 outward or may rotate a platform of the loading apparatus 50 flat and lower the platform to the ground.

Figure 5:
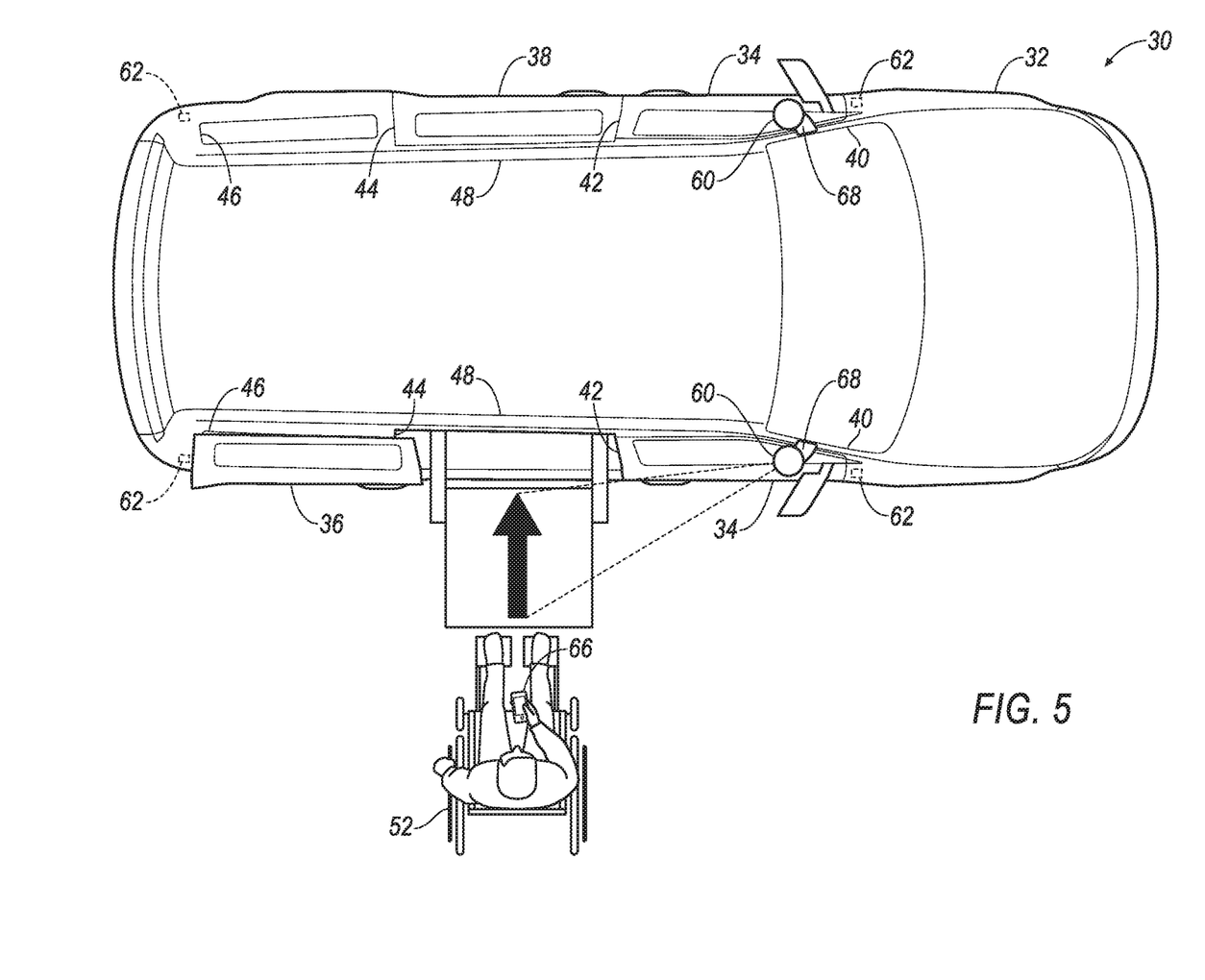
FIG. 5 is a top view of the vehicle of FIG. 1 with the puddle lamp projecting a third light projection.

Next, in a block 845, the computer 54 actuates the puddle lamp 64 to project a third light projection 76 on the ground in front of the accessible door 36. The third light projection 76 has at least one of a different shape and a different color than each of the first light projection 70 and the second light projection 74. The third light projection 76 may be chosen to communicate to the user to enter the vehicle 30, e.g., by rolling up the ramp or onto the platform of the loading apparatus 50. For example, as shown in FIG. 5, the third light projection 76 may be an arrow pointing toward the accessible door 36, instructing the user to move toward the vehicle 30. The third light projection 76 may be a third color, e.g., green, to indicate that the user can proceed.

Next, in a block 850, the computer 54 receives data generated by the sensor 60 and/or by the BLE sensors 62, as described above with respect to the block 805.

Next, in a decision block 855, the computer 54 determines from the data received from the sensor 60 whether an obstruction is in a designated area 78 relative to the vehicle 30. The designated area 78 may be chosen as an area in which an object may interfere with closing the door or retracting the loading apparatus 50. For example, the computer 54 may receive data from the sensor 60 and perform a known object-detection algorithm on the data to detect any objects within the designated area 78. If no obstruction is in the designated area 78, the process 800 proceeds to a block 865.

Figure 6:
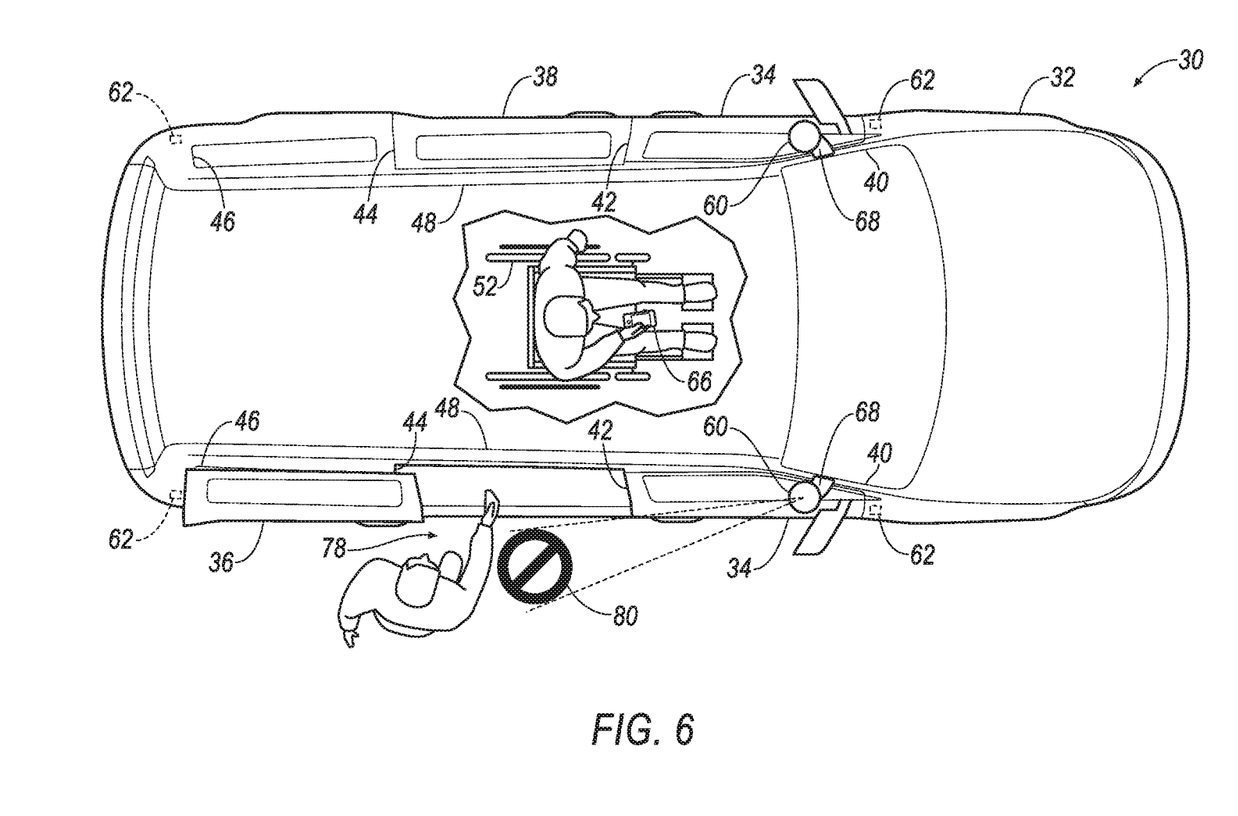
FIG. 6 is a top view of the vehicle of FIG. 1 with the puddle lamp projecting a fourth light projection.

If an obstruction is in the designated area 78, next, in a block 860, the computer 54 actuates the puddle lamp 64 to project a fourth light projection 80 on the ground in front of the accessible door 36. The fourth light projection 80 has at least one of a different shape and a different color than each of the first light projection 70, the second light projection 74, and the third light projection 76. The fourth light projection 80 may be chosen to communicate to the user or to another nearby person (who may be the obstruction) to avoid the designated area 78. For example, as shown in FIG. 6, the fourth light projection 80 may be a circle-backslash symbol, instructing the user or other people to avoid the designated area 78. The fourth light projection 80 may be, e.g., red, to indicate danger.

If no obstruction is in the designated area 78, after the decision block 855, in the block 865, the computer 54 actuates the loading apparatus 50 to retract. The loading apparatus 50 may reverse the operations performed in the block 840, e.g., retracting a ramp of the loading apparatus 50 inward or raising a platform of the loading apparatus 50 and rotating the platform upright.

Next, in a block 870, the computer 54 actuates the accessible door 36 of the vehicle 30 to close. After the block 870, the process 800 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system for a vehicle, the system comprising:
   a LIDAR sensor attachable to the vehicle;
   a puddle lamp fixed relative to the LIDAR sensor and oriented to project a first light projection downward beside the vehicle; and
   a computer in communication with the LIDAR sensor and the puddle lamp and programmed to actuate the puddle lamp to project the first light projection in response to receiving data from the LIDAR sensor indicating a user positioned within a threshold distance of the vehicle, and then actuate the puddle lamp to project a second light projection in response to receiving data from the LIDAR sensor indicating that the user is positioned at a designated location relative to the vehicle.

2. The system of claim 1, wherein the LIDAR sensor is attachable to an A pillar of the vehicle.

3. The system of claim 1, wherein the puddle lamp is attached to the LIDAR sensor.

4. The system of claim 3, wherein the puddle lamp is disposed underneath the LIDAR sensor.

5. The system of claim 1, wherein the first light projection and the second light projection have at least one of different shapes and different colors.

6. The system of claim 1, wherein the computer is programmed to actuate a door of the vehicle to open in response to receiving data from the LIDAR sensor indicating that the user is positioned at the designated location relative to the vehicle.

7. The system of claim 1, wherein the light projection is a first light projection, the computer is programmed, after actuating to actuate the puddle lamp to project the first light projection in response to receiving data from the LIDAR sensor indicating the user positioned within the threshold distance from the vehicle, and then actuate the puddle lamp to project a third light projection in response to receiving data from the LIDAR sensor indicating an obstruction in a designated area relative to the vehicle.

8. A system for a vehicle, the system comprising:
   a plurality of Bluetooth Low Energy sensors including a sensor;
   a puddle lamp fixed relative to the sensor and oriented to project a light projection downward beside the vehicle; and
   a computer in communication with the sensor and the puddle lamp and programmed to actuate the puddle lamp in response to receiving data generated by the sensor indicating a user positioned within a threshold distance of the vehicle.

9. The system of claim 8, wherein the light projection is a first light projection, the computer is programmed to actuate the puddle lamp to project the first light projection in response to receiving data generated by the sensor indicating the user positioned within the threshold distance of the vehicle, and then actuate the puddle lamp to project a second light projection in response to receiving data generated by the sensor indicating that the user is positioned at a designated location relative to the vehicle.

10. The system of claim 9, wherein the first light projection and the second light projection have at least one of different shapes and different colors.

11. The system of claim 8, wherein the computer is programmed to actuate a door of the vehicle to open in response to receiving data generated by the sensor indicating that the user is positioned at a designated location relative to the vehicle.

12. The system of claim 8, wherein the light projection is a first light projection, the computer is programmed to actuate the puddle lamp to project the first light projection in response to receiving data generated by the sensor indicating the user positioned within the threshold distance from the vehicle, and then actuate the puddle lamp to project a second light projection in response to receiving data generated by the sensor indicating an obstruction in a designated area relative to the vehicle.

13. The system of claim 8, wherein the computer is programmed to triangulate a position of the user based on data generated by the Bluetooth Low Energy sensors.

14. The system of claim 8, further comprising the vehicle including a body, a plurality of doors, the sensor, the puddle lamp, and the computer, wherein the puddle lamp is attached to the body and spaced from the doors.

15. The system of claim 14, wherein the puddle lamp is oriented to project the light projection beside one of the doors.

16. A system for a vehicle, the system comprising:
    a sensor;
    a puddle lamp fixed relative to the sensor and oriented to project a light projection downward beside the vehicle; and
    a computer in communication with the sensor and the puddle lamp and programmed to actuate the puddle lamp in response to receiving data generated by the sensor indicating a user positioned within a threshold distance of the vehicle, and actuate a door of the vehicle to open in response to receiving data generated by the sensor indicating that the user is positioned at a designated location relative to the vehicle.

* * * * *